United States Patent
Chen et al.

(10) Patent No.: US 7,073,050 B2
(45) Date of Patent: Jul. 4, 2006

(54) METHOD AND SYSTEM FOR REPORTING CONFIGURATION DATA FOR QUERIABLE AND NON-QUERIABLE INSTALLED COMPONENTS

(75) Inventors: Ping Chen, Superior, CO (US); Lawrence Allen Hurst, Jr., Austin, TX (US); Joseph Gregory Lovato, Loveland, CO (US); Arthur Hawley Parmelee, Niwot, CO (US); Daniel Jack Wingard, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/346,247

(22) Filed: Jan. 16, 2003

(65) Prior Publication Data

US 2004/0143507 A1     Jul. 22, 2004

(51) Int. Cl.
*G06F 15/177*  (2006.01)
*G06F 11/00*   (2006.01)
*G06F 7/00*    (2006.01)

(52) U.S. Cl. .............. 713/1; 713/2; 713/100; 709/220; 709/221; 714/1; 707/3; 707/4

(58) Field of Classification Search .............. None
See application file for complete search history.

(56) References Cited

U.S. PATENT DOCUMENTS

| | | | |
|---|---|---|---|
| 5,289,372 A * | 2/1994 | Guthrie et al. | 705/28 |
| 5,758,071 A * | 5/1998 | Burgess et al. | 709/220 |
| 6,170,056 B1 * | 1/2001 | Sidie | 713/2 |
| 6,178,529 B1 | 1/2001 | Short et al. | 714/51 |
| 6,345,259 B1 | 2/2002 | Sandoval | 705/7 |
| 6,405,310 B1 | 6/2002 | Simpson | 713/1 |
| 2003/0120760 A1 * | 6/2003 | Fortin et al. | 709/221 |
| 2004/0030879 A1 * | 2/2004 | Subramanian et al. | 713/1 |

OTHER PUBLICATIONS

"IBM Link Preview Area", downloaded on Nov. 18, 2002 from http://www2.ibmlink.ibm.com, 1 page.
"InfoLink Applications Matrix", downloaded on Nov. 18, 2002 from http://www2.ibmlink.ibm.com, 2 pages.
"OrderLink Applications Matrix", downloaded on Nov. 18, 2002 from http://www2.ibmlink.ibm.com, 2 pages.
"MRPD", downloaded on Nov. 18, 2002 from http://www2.ibmlink.ibm.com, 1 page.
"Machine Reported Product Data—Main Menu", downloaded on Nov. 18, 2002 from http://www2.ibmlink.ibm.com, 1 page.

* cited by examiner

Primary Examiner—James K. Trujillo
(74) Attorney, Agent, or Firm—Robert H. Frantz; David A. Mims, Jr.

(57) ABSTRACT

The machine-native format of a machine reported configuration data set is identifying, and a set of rules is employed to translate the data set from machine-native format into a common format such as sales nomenclature. The common format configuration information is stored in a globally accessible repository, and retrieved to produce accurate and comprehensive configuration reports for complex configurable systems such as computer servers. These configuration reports may be utilized in order and need fulfillment, such as ordering system upgrades and repair components, scheduling manufacturing, assembly and shipping.

16 Claims, 5 Drawing Sheets

METHOD AND SYSTEM FOR REPORTING CONFIGURATION DATA FOR QUERIABLE AND NON-QUERIABLE INSTALLED COMPONENTS

BACKGROUND OF THE INVENTION

1. Field of the Invention

This invention relates to technologies for managing, monitoring, and gathering information regarding electronics, mechanical, and software configurations of complex configurable products such as computers, servers, switches, routers, etc.

2. Background of the Invention

Many modern technology systems such as computers, web servers, telephone switches, Internet routers, test equipment, manufacturing control systems, etc., are configurable as to their electronic, mechanical and software components. For example, a personal computer is configurable to meet the needs of the user or customer by adding circuit cards (e.g. PCI or EISA graphics cards, LAN interface cards, etc.), additional integrated circuits in sockets (e.g. memories, coprocessors, etc.), software components (e.g. application programs, drivers, utilities, etc.), and even mechanical components (e.g. panels, covers, brackets, etc.). Many products adopt configurable architectures to enable modular assembly techniques, cost reduction, and field upgradability.

As such, many systems are originally delivered by an Original Equipment Manufacturer ("OEM") with "known" configuration. The OEM may retain records as to the configuration of each unit, tracked by order number, customer number, and/or base system serial number, for future reference. For example, a purchaser of a system may request some time after delivery service of a configurable component, or upgrade of the system. In order to accurately fulfill the need, the OEM must consult its records regarding the original configuration of the system, or manually verify the configuration of the system.

Because many of these systems are designed as "open" architectures in which users or third-party companies may perform upgrades and service to various components, a system's configuration may evolve after delivery to a customer or user. Thus, the OEM's configuration records for each such machine become out of date and inaccurate, making it difficult or even impossible to provide accurate and quick fulfillment of upgrade and service needs of the customer. Although this problem is true for many types of computing, electronic, industrial and communications equipment, this situation is especially applicable to computer configurations for personal computers and server computers. In computing parlance, the configuration of a system is often referred to as the "feature content", and the configuration computer platform is often referred to as the "machine".

In order to change the feature content or to process model upgrades to complex configured systems, it is a business requirement to know the current configuration or "starting point" of the target machine to be modified. It is well known that the networked world, with its unprecedented premium on speed, demands a heightened and relentless focus on quality. Attempts to upgrade or replace components which are not successful may result in unnecessary system downtime, expense, and risk.

Some suppliers and service providers of such configurable systems have resorted manually intensive procedures, wherein a technician visits a site to perform an "inventory" of a system configuration, or the system must be shipped back to a service depot or manufacturer's facilities. For cost and inconvenience reasons, these two approaches are rarely acceptable to many customers.

Some companies such as International Business Machines ("IBM") have instituted use of electronic configuration records, or "installed machine inventory records", which are maintained in a database (or multiple databases) by IBM. However, installed machine inventory records are often inaccurate and an inadequate representation of current customer installed system configurations, due to the ability of parties to make configuration changes and upgrades, especially software modifications, without coordinating with or cooperating with the manufacturer's processes for updating the installed machine inventor records. Business partners may perform upgrades or repairs, the customer may relocate components (e.g. swap components from one machine to another), and other manufacturers may supply upgrades, all "out of the loop" of the process designed to track each machine's configuration.

Concurrently, increased dependencies on Business Partners in support of Manufacturing, Sales, and Service has created greater demand and need for a simple and accurate process to determine the starting configuration of customer installed systems. Configured hardware and software data used to create starting point inputs in the Sales and Manufacturing configuration processes are obtained from multiple sources in today's end-to-end process, and are often inaccurate. As such, manually intensive and costly processes in each service region are still required in an attempt to maintain data integrity of configuration records.

Customers require, over time, to increase computer capacity and function of their computer systems. IBM is somewhat unique in the method presently employed to provide increased capacity and function to systems by using an "MES/upgrade" process, which requires "starting point" input data accuracy. Many competitors in the same market segment have elected to use a "box swap" order process methodology, in which a replacement system is configured to mimic a desired upgraded original system, the replacement system is then installed in place of the original system, and the original system is taken out of service and returned to the manufacturer for recycling of components for other replacement systems. Tracking warranty status of such "swapped" systems is especially difficult, as each "upgrade" to a customer's system may result in every component of the system being exchanged for components of differing ages, revision level, in-service time, serial numbers, etc.

Additionally, even with a box swap approach, manual configuration verification is often employed to make absolutely certain that the replacement system is an accurate upgrade configuration from the original system's configuration.

An advantage of the IBM MES/Upgrade process is that it provides a systematic process of obtaining installed configuration information via utilization of machine sensed and reported configuration information, also known as Vital Product Data ("VPD"). The MES/Upgrade process benefits over box swapping are in the area of preserving a machine serial number (and serial numbers for components within the system) as part of investment protection offerings (e.g. warranties, service plans, etc.).

VPD information is especially useful for high volume products within IBM. However, the volume of machines sold and deployed through such a successful company as IBM prohibit easy and cost effective collection, storage, and subsequent sharing of this information. For this reason, the VPD information is obtained on an "engagement basis" (e.g. at the time a need is determined such as at the time an upgrade order is placed).

Collection of VPD information can be difficult and incomplete, even with the best available tools designed to semi-automatically collect such information. Therefore, there is a need in the art for a system which more efficiently collects system configuration information on an "engagement basis", in a manner which facilitates and supports high dependency of original equipment manufacturers on business partners and third party vendors, but which avoids adding significant cost, complexity or failure rate to configurable systems, and which avoids intensive manual inventorying activities.

BRIEF DESCRIPTION OF THE DRAWINGS

The following detailed description when taken in conjunction with the figures presented herein provide a complete disclosure of the invention.

SUMMARY OF THE INVENTION

Machine Reported Product Data—Vital Product Data, ("MRPD-VPD") is a re-engineered business process and computing technology implementing that business process which collects, translates, and stores information that uniquely define system components contained within a customer's installed system.

VPD is accurate, machine-reported hardware and software data. Our new MRPD data repository serves as a single source for storing and retrieving the data. MRPD increases the "starting point" input data accuracy through the use of VPD, Vital Product Data. MRPDclassic ("MRPD") is built upon a closed loop integrated business process concept that requires support from multiple product development brands, manufacturing, service providers and each customer. All facets of the closed loop process should be in place in order for the process to be optimally effective.

The MRPD process is a key step in making this data available to system configurators and users. When submitted in an "MRReport" format, the data is used to improve process efficiency by providing a more efficient means of obtaining accurate MES/upgrade Order starting point information. Thus, use of the present invention provides:

(a) improved data quality;
(b) reduced service expense;
(c) reduced order fulfillment cycle time; and
(d) increased customer satisfaction.

While the primary use of VPD data is as input to the order configuration process by system sales personnel (e.g. Business Partners, enterprise customers, post sales configuration technicians, etc.), manufacturing, engineering support, and service personnel also use this data for a variety of purposes.

Manufacturing departments may use results from the configuration process (e.g "CFReports") to execute each system's manufacturing order, including building the initial system, testing the configuration, and implementing required engineering change processes.

As such, our MRPD process provides existing order processes, such as IBM's own MES/Upgrade process, accurate system configuration information, and addresses the opportunity and need to provide a single world-wide data repository and process, and avoids manually intensive inventories of existing system configurations.

DESCRIPTION OF THE INVENTION

A primary objective of our new Machine Reported Product Data ("MRPD") process is to facilitate the creation of a starting point record needed in support of the MES order process, with VPD data accuracy.

Our initial implementation of MRPD supported the IBM MES order process, and in time, other business processes and organizations have found the produced information highly useful and reliable, including Sales Personnel, Manufacturing Logistics, Asset Protection, Service, Engineering & Field Management, and Quality Control.

The most accurate source for current configuration information of a customer installed system is to systematically obtain the hardware/software information needed from the machine itself at the time the information is needed. Enablement of the machine to survey its contents and provide the information, at the time the information is needed, is the our preferred means for ensuring data accuracy. Software programs which can inspect or query installed components such as disk drives, subsystem boards, controllers, memory modules, etc., can, on demand, collect a partial inventory of system components, including component model, size, serial number, revision level, manufacturer, installation date, etc., to the extent each component supports such reporting.

Additionally, records may be created on each machine to record some or all of this same information for components which do not support such queries. For example, a mechanical bracket to hold disk drives in a mainframe may be a critical factor in determining if it can receive an additional disk drive unit. Since the bracket is mechanical structure, it could not respond to a software query as to its model, manufacturer, etc. So, a record can be created for the bracket with this information, and stored in a file or database accessible by the resident VPD report generating utility program.

Through coordinated and cooperative efforts between business process and application owners, as well as product development, manufacturing, and data management owners, an end-to-end integrated solution has been developed that is positioned to meet and exceed customer application and business process needs, which supports enhances business process effectiveness, reduces the total cost of system ownership, and improves overall customer satisfaction.

In our exemplary embodiment, MRPD has been implemented as an option to IBMLink. IBMLink is a well-known, online service provided by IBM as an OEM to its distributors, business partners, and authorized resellers. IBMLink is a comprehensive information retrieval system which provides a convenient point of electronic access for IBM customers, business partners, alliances, and others. Using IBMLink, information may be obtained regarding IBM products, pricing, product configurations, technical support for hardware and software, and more. Electronic mail, file transfer, publications ordering, and online guides are among the other offerings included on IBMLink. Information and applications on IBMLink are designed to improve customer support and increase productivity for customers and IBM.

IBMLink is partitioned into several service categories, including:

(a) InfoLink for sales manuals, announcements, and catalogs;
(b) OrderLink for system configurators, prices and schedules;
(c) ServiceLink for problem resolution, questions and answers, and preventative service;
(d) MartLink for information service; and
(d) UserFunctions for profiles, IBMLink guides, notes and forms.

In our exemplary embodiment, the MRPD services are provided as part of OrderLink within IBMLInk. It will be readily apparent, however, that the present invention may be alternatively realized in conjunction with or independently of other OEM support services and systems, and that the scope of the present invention is not limited to the exemplary embodiment described herein with respect to IBMLink.

The following functions and processes of MRPD have been realized in Sun Microsystem's JAVA [TM] programming language and Object-Oriented Programming ("OOP") methodology in a Java 2 Platform Enterprise Edition ("J2EE") paradigm. The invention was initially implemented in the C programming and procedural programming methodology. While either implementation, or alternate implementations in other methodologies and languages, may be sufficient in certain cases, we believe the platform independence and OOP advantages of implementation in JAVA (e.g. write one, run everywhere) are considerable.

Additionally, the following arrangements and processes have been implemented using the well-known MQSeries and Transmission Control Protocol/Internet Protocol ("TCP/IP") Systems Network Architecture ("SNA") interface protocols, although other suitable choices may be employed within the scope of the present invention.

The following detailed description, then, provides graphical and functional description of functions and interfaces of the invention, and preferably realized as program code such as "C" and/or Java.

Figure 1:
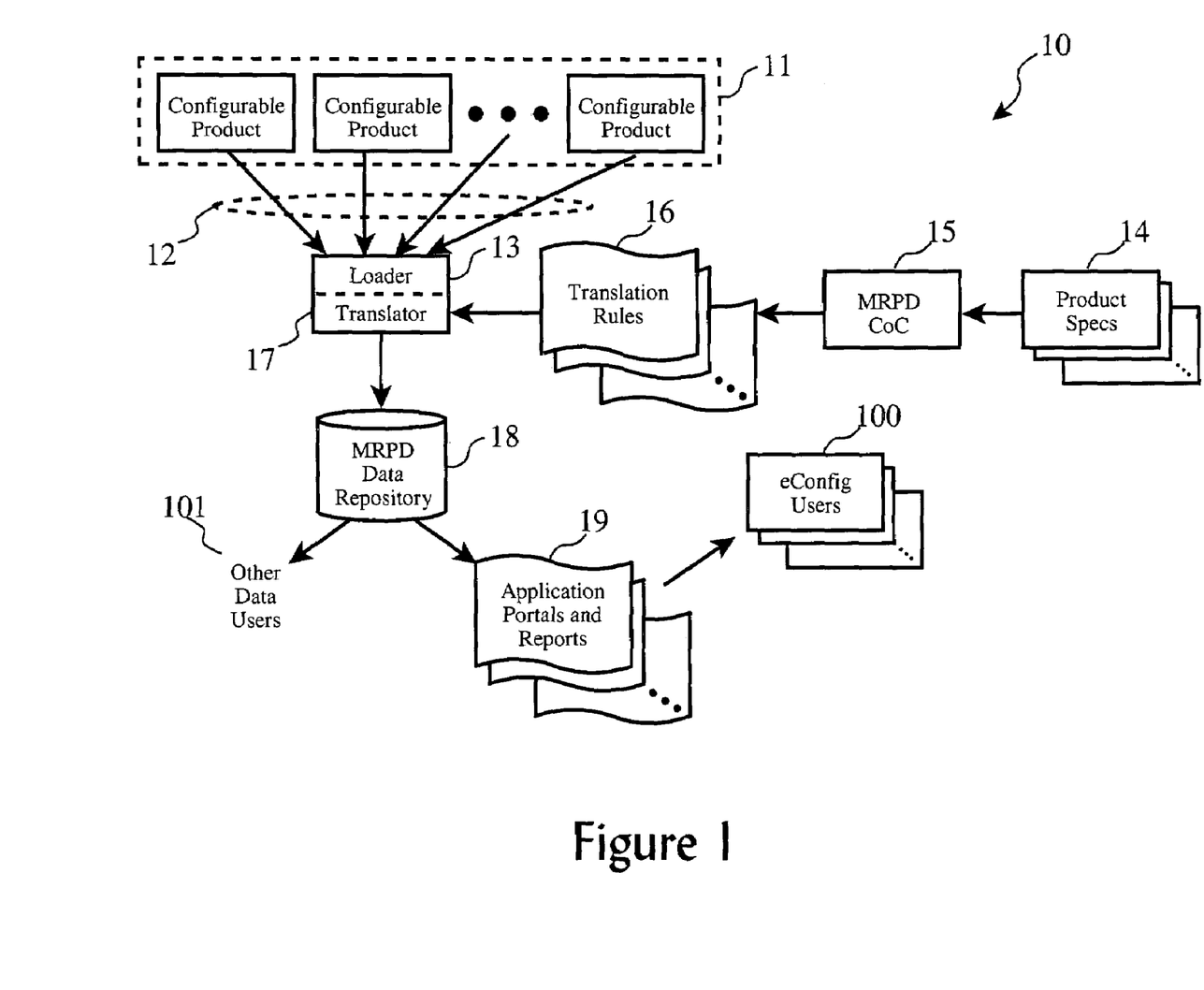
FIG. 1 illustrates the present invention from a top-level system perspective.

Turning to FIG. 1, a number of configurable systems or configurable products (11) are enabled to perform a self-inventory or self-configuration assessment. Machines such as IBM i-, p-, and zSeries Servers, large Direct Access Storage Devices ("DASD"), tape drives, and printers are all candidates for such enablement, and many of these have already been so enabled in production. Under software command, an operator or user can invoke a routine which gathers the content of the machine by part number. This may include system boards, add-in boards, power supplies, software programs, etc. In the preferred embodiment, these components are Vital Product Data ("VPD") enabled (e.g. they report their characteristics in formats according to the IBM VPD format), but in alternate embodiments, other formats of query-response can be employed. This information preferably includes component make and model identifiers, serial numbers, manufacturing date, revision level, firmware level, etc.

The configurable systems (11) communicate (12) with our MRPD system's loader (13), which receives machine reported configuration data from the configurable systems and determines the machine-native format of the data. This allows each product type to report its data in its own format, and avoids the need to retrofit many different existing machines to be able to report configuration data in a common or universal format.

As each system reports their configuration data, a translator (17) is provided to convert the machine reported configuration data from its native or original format into an MRPD system-wide format, which is preferably in a sales nomenclature format of feature codes typically found in a catalog. This allows upgrades and replacements to be determined directly from the common-format data.

This common-format data is stored in a repository (18), such as a database. This data can then be accessed via application portals and various reports (19) (e.g. MRReports), electronic configuration users (100), and other types of users (101). As this database is preferably accessible from any point on the World-wide Web, it provides a single, comprehensive source of system configuration information with uniform information format, regardless of the system being described and regardless each system's native self-inventory data format.

To accomplish the translation from the machine-native formats from the configurable systems into a common data format, a set of translation rules (16) is employed, which are preferably developed and provided to the system by an MRPD Center of Competence ("CoC") (15) (e.g. the system support and administration team) based upon product specifications (14) for each system type. As configuration data is received (12) from a configurable product (11), the product type is identified so that a translation rule set (13) can be selected and used to translate the data into the MRPD common format for storing in the MRPD repository (18). In alternate embodiments, the translation rules could be provided by vendors, third-parties, and other manufacturers, especially for configurable subsystems within the configuration system.

Figure 2:
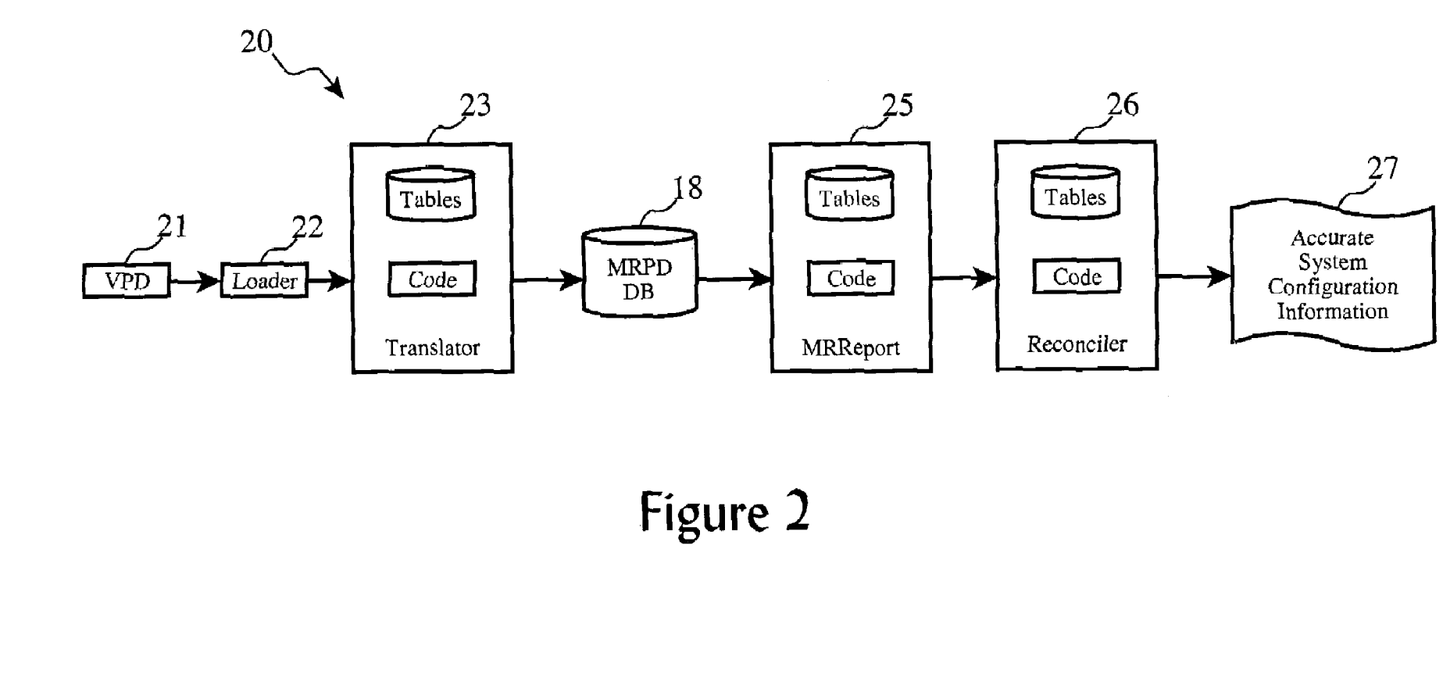
FIG. 2 shows details of the process of the present invention.

Turning now to FIG. 2, more details of the process according to the invention are shown. The machine reported configuration data (21), such as IBM VPD, is received into the loader (22), which recognizes the native format of the machine reported configuration data. The loader determines the product type (e.g. iSeries server, zSeries server, printer, etc.), and decodes the data into individual data elements.

The translator (23) then employs translation tables and/or translation code appropriate to the recognized native format of the machine reported configuration data, such that common-format machine configuration data is produced, preferably in sales nomenclature including feature codes. This common-format machine configuration data is then stored in the MRPD database (18) until retrieved by a user.

The common-format machine configuration data is then retrieved when needed (e.g. when determining needed components for an upgrade or repair) by Machine-reported Report ("MRReport") function which applies additional translation tables and/or software code to produce a Configuration Report ("CFReport"), which contains the VPD information for the reporting machine in a human-readable format.

In a final stage of processing, the configuration report is reconciled (26) manually using tables, code and a user interface, to add or remove non-VPD enabled components (e.g. components in the system configuration which are known not to be able to report themselves either as installed or de-installed) to and from the configuration report. This yields a complete and accurate configuration of the system.

Figure 3:
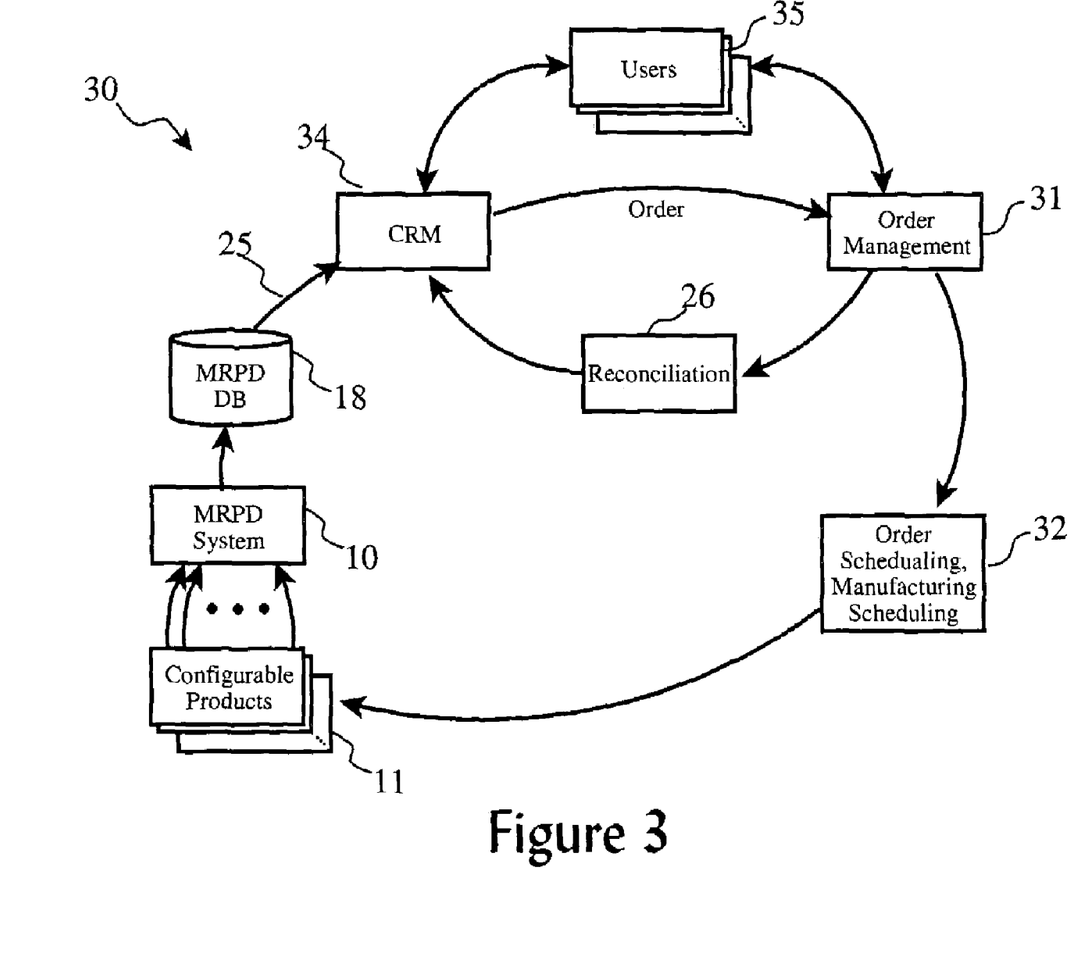
FIG. 3 depicts the usefulness of the present invention in conjunction with customer need and order fulfillment.

FIG. 3 illustrates the MRPD role in the overall order fulfillment process (30). Each configurable product (11) on command electronically reports its configuration data to the MRPD system (10), which processes the reported data as previously described, and stores the data into the MRPD database (18) in the common format (18). Using the configuration reports from the MRPD database (18), a customer relationship management ("CRM") system is employed to perform actual order generation (e.g. determining exactly what feature codes are needed to fulfill the customer need). CRM users (35) may access the order to perform manual configuration review, editing, and validation, and may submit the order to an order management system (31).

The order management system (31) then is used by manufacturing, testing and shipping departments to schedule and fulfill the customer's need or requirement. As shown in FIG. 3, additional reconciliation (25) of the system configuration to account for known discrepancies in the system configuration, if needed.

Figure 4:
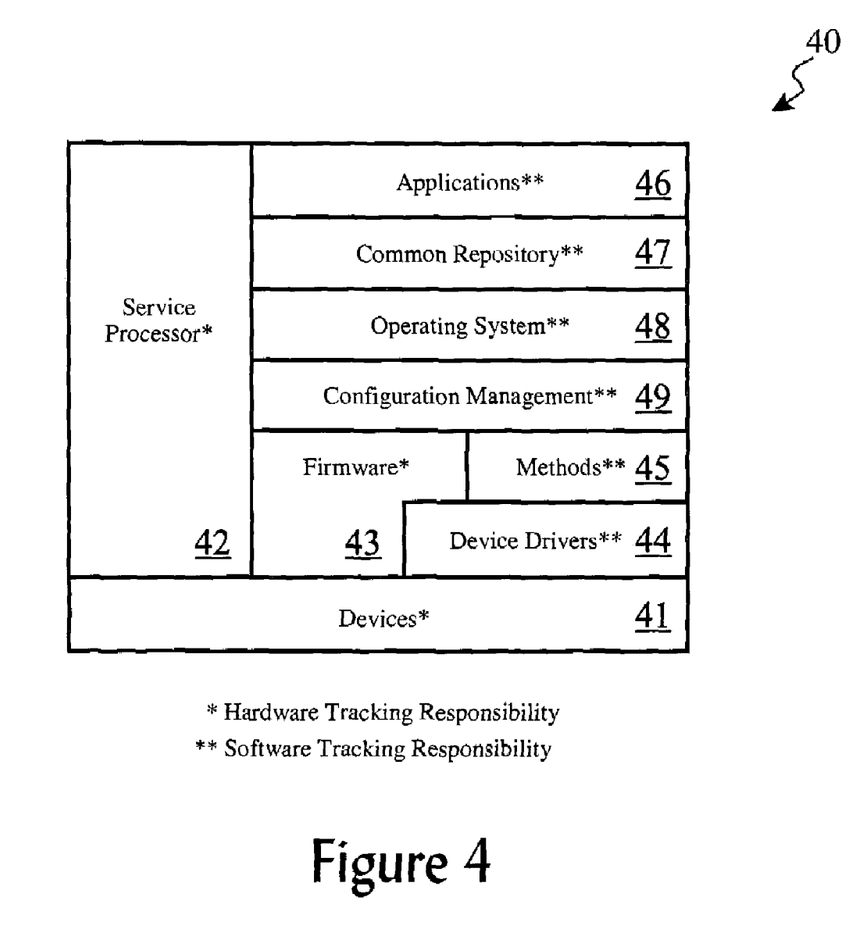
FIG. 4 provides details of a complex configurable system, such as a server computer, which is enabled to perform a self-inventory survey.

In FIG. 4, more details of a configurable product which is enabled to perform a self-inventory and report its configuration to our MRPD system. Such a system (40) comprises hardware-tracked and software-tracked device. Each component is ideally provided with the capability to be queried as to its part number, revision level, serial number, manufacturer, device ID, and Field Replaceable Unit ("FRU") number (e.g. slot number, bay number, etc.). This is typically done for hardware components by storing this information in a Read-only Memory ("ROM") on the device which is then either directly readable by system software or accessible via component firmware.

Software components such as application software, operating system components, device drivers, etc., are also preferably provided with an interface or function which allows an inventorying program to query their characteristics such as product name (e.g. AIX, OS/400, etc.), revision or release level, supplemental update/fix packs applied, options installed, etc.

So, as shown in FIG. 4, hardware-tracked components may include, but are not limited to:
  (a) devices (41) such as network interface cards, add-in circuit cards and packs, peripheral interfaces, etc.,;
  (b) service processor (42) such as RISC processors, PowerPC processors, Intel Pentium processors, etc., including chipset components such as graphics and communications coprocessors, cache units, etc.; and
  (c) firmware (43) such as functions embedded on cards and chips.
  Additionally, software-tracking may be applied to configurable components including, but not limited to:
  (d) device drivers (44);
  (e) methods (45);
  (f) configuration management utilities (49);
  (g) operating system and OS components (48);
  (h) repository products (47); and
  (i) application programs (46).

Among the application programs (46) is at least one user-operable self-inventorying program which, upon invocation, queries all appropriately enabled system components, builds a report of the system configuration in a machine-native format, and communicates that report to the MRPD system. Some well-known existing self-inventory programs available on existing IBM configurable products, for example are "umic", "lscfg", "Inventory Scout", "WRKORDINF", etc.

Figure 5:
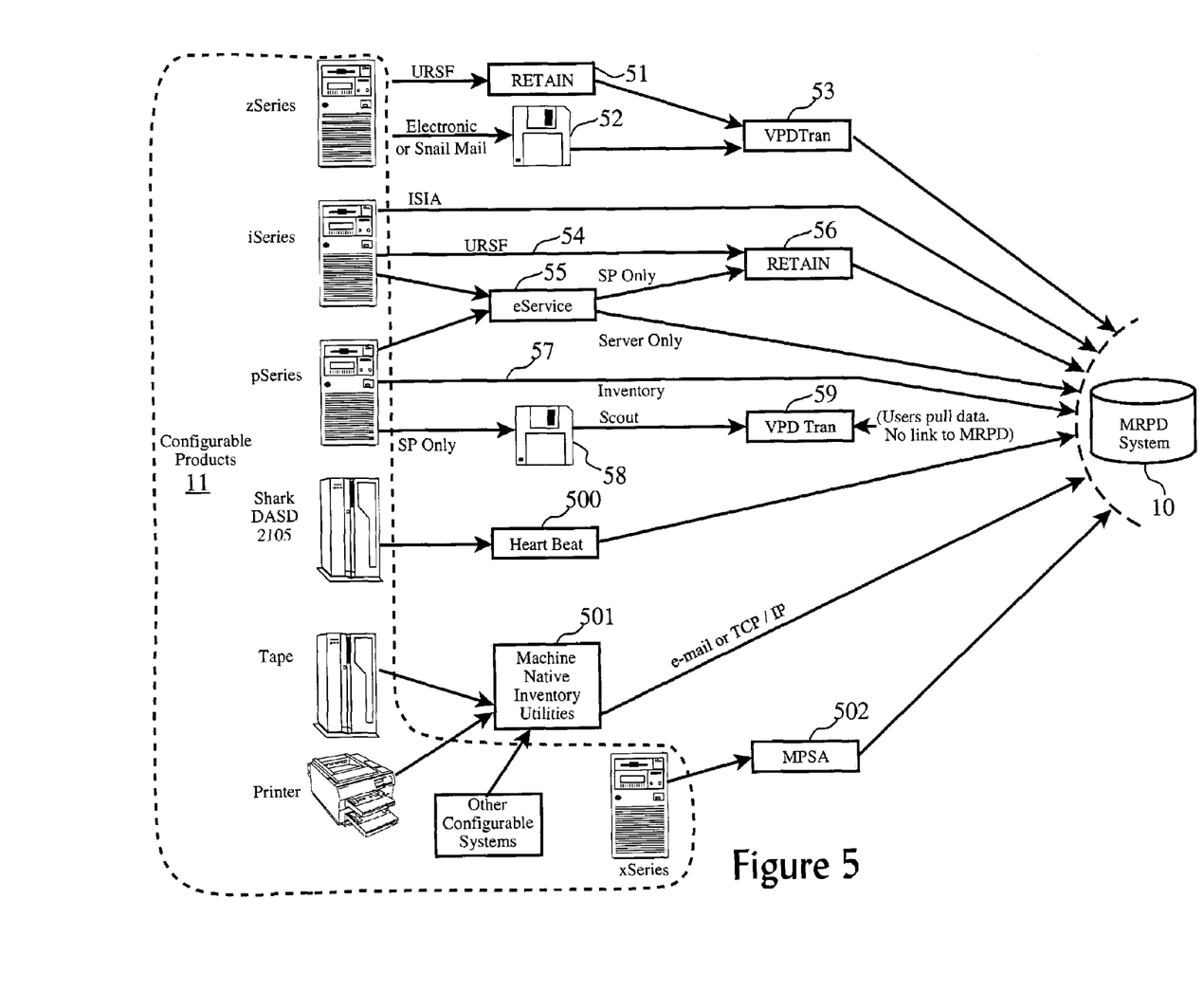
FIG. 5 illustrates the usefulness of the present invention with respect to the vast number of machine and system types which may be served by the invention.

Now, shown in FIG. 5, a view of the various methods, formats and protocols for collecting all the different machine configurations in all their different formats is shown. Some systems which are not enabled to communicate via a modem or computer network may report their configurations through an electronic file stored on a removable disk (52, 58) such as a floppy disk, or by administrator-attached files on electronic mail messages. Each of the acronyms and abbreviations (51–59, 500–502) shown in FIG. 5 are well-known and well-understood by users and administrators within the user community for each type of machine illustrated, such as Multi-Platform Service Agent ("MPSA") (502) for xSeries servers. FIG. 5 is provided as an illustration of our MRPD system's ability to receive many different types of machine reported data, but not to indicate that any of these types of data is required by the MRPD system, and not to indicate that this set of machine report data types is the extent to which the MRPD system may be utilized.

Also as shown, electronic communication of the machine-native configuration report may be done by known computer communications schemes (e.g. TCP/IP, email, file transfer protocol, etc.), by physical storage transportation (e.g. "sneakernet"), or by proprietary methods, without departing from the scope of the invention.

Those skilled in the art will readily recognize that the various aspects of embodiments disclosed herein are provided as illustrative details, and do not represent limitations of the scope of the present invention. Alternate computing platforms, programming methodologies, communications protocols, and storage technologies can be employed to realize the present invention. Therefore, the scope of the present invention should be determined by the following claims.

What is claimed is:

1. A method comprising the steps of:
  storing by a configurable computing machine one or more records regarding non-queriable and non-self-reportable components installed in a computing machine;
  on demand from a loader for a configuration report, preparing a configuration data set in a machine-native format by a vital product data utility resident on said computing machine by querying one or more queriable components of said first machine, and by including said records regarding non-queriable and non-self-reportable installed components;
  loading by said loader said machine reported configuration data set by identifying a machine-native format of said machine reported configuration data set; and
  translating said loaded machine reported configuration data set into a human-readable configuration report containing sales nomenclature catalog feature codes for each of said queriable component and each of said non-queriable component installed in said computing machine.

2. The method as set forth in claim 1 wherein said step of loading a machine reported configuration data set comprising loading a self-inventory data set generated by a machine selected from the group of an application server, a storage server, and a computer peripheral system.

3. The method as set forth in claim 1 wherein said step of loading a machine reported configuration data set comprises loading a plurality of self-inventory data sets generated by machines having a plurality of different operating systems among them.

4. The method as set forth in claim 1 wherein said step of translating said loaded machine reported configuration data set into sales nomenclature comprises employing a table to translate from machine-native component codes to catalog feature codes.

5. The method as set forth in claim 1 wherein said step of loading a machine reported configuration data set comprises receiving said machine report configuration data set by a method selected from the group of file transfer over a computer network, electronic mail, and reading of a removable computer media.

6. A computer-readable medium encoded with software for performing by a computer the steps of:
  storing by a configurable computing machine one or more records regarding non-queriable and non-self-reportable components installed in a computing machine;
  on demand from a loader for a configuration report, preparing a configuration data set in a machine-native format by a vital product data utility resident on said computing machine by querying one or more queriable components of said machine, and by including said records regarding non-queriable and non-self-reportable installed components;
  loading by said loader said machine reported configuration data set by identifying a machine-native format of said machine reported configuration data set; and
  translating said loaded machine reported configuration data set into a human-readable configuration report containing sales nomenclature catalog feature codes for each of said queriable component and each of said non-queriable component installed in said computing machine.

7. The computer readable medium as set forth in claim 6 wherein said software for loading a machine reported configuration data set comprising software for loading a self inventory data set generated by a machine selected from the group of an application server, a storage server, and a computer peripheral system.

8. The computer readable medium as set forth in claim 6 wherein said software for loading a machine reported configuration data set comprises software for loading a plurality of self-inventory data sets generated by a plurality of machines having a plurality of different operating systems among them.

9. The computer readable medium as set forth in claim 6 wherein said software for translating said loaded machine reported configuration data set into a sales nomenclature comprises software for employing a table to translate from machine-native component codes to catalog feature codes.

10. The computer readable medium as set forth in claim 6 wherein said software for loading a machine reported configuration data set comprises software for receiving said machine report configuration data set by a method selected from the group of file transfer over a computer network, electronic mail, and reading of a removable computer media.

11. A machine reported product data system comprising:
  one or more records regarding non-queriable and non-self-reportable components stored by and installed in a configurable computing machine;
  a vital product data utility resident on said computing machine adapted to, responsive to demand from a loader, prepare a configuration data set in a machine-native format by querying one or more queriable components of said machine, and by including said records regarding non-queriable and non-self-reportable components;
  a machine-reported configuration data set loader adapted to receive said configuration data set; and
  a machine-reported configuration data set translator which translates said loaded data set into human-readable configuration report containing sales nomenclature catalog feature codes for each of said queriable component and each of said non-queriable component installed in said computing machine.

12. The system as set forth in claim 11 wherein said machine-reported configuration data set loader is adapted to receive IBM Vital product pata (VPD) data.

13. The system as set forth in claim 11 wherein said translator is adapted to produce configuration data sets in a sales nomenclature using a table to translate from machine-native component codes to catalog feature codes.

14. The system as set forth in claim 11 wherein said translator comprises selectable translation tables and selectable translation code according to an identifiable machine-native format of said loaded machine reported configuration data set.

15. The system as set forth in claim 11 wherein said configuration report generator is further adapted to produce a computer-readable configuration report.

16. The system as set forth in claim 11 wherein said reconciler further comprises a user interface for affecting said report additions and deletions.

* * * * *